US012655050B2

(12) United States Patent
Park et al.

(10) Patent No.: US 12,655,050 B2
(45) Date of Patent: Jun. 16, 2026

(54) ULTRAPURE WATER PRODUCTION FACILITY

(71) Applicant: Samsung Electronics Co., Ltd., Suwon-si (KR)

(72) Inventors: Eunhye Park, Incheon (KR); Juhui Park, Hwaseong-si (KR); Seyoon Kim, Hwaseong-si (KR); Jiyeon Lee, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 466 days.

(21) Appl. No.: 18/172,566

(22) Filed: Feb. 22, 2023

(65) Prior Publication Data

US 2023/0264998 A1    Aug. 24, 2023

(30) Foreign Application Priority Data

Feb. 22, 2022    (KR) ......................... 10-2022-0023212

(51) Int. Cl.
*C02F 9/00*           (2023.01)

(52) U.S. Cl.
CPC .......... *C02F 9/00* (2013.01); *C02F 2201/005* (2013.01); *C02F 2203/006* (2013.01); *C02F 2209/003* (2013.01)

(58) Field of Classification Search
CPC .... C02F 1/008; C02F 1/20; C02F 1/32; C02F 1/42; C02F 1/441; C02F 1/444; C02F 1/325; C02F 1/44; C02F 1/02; C02F 1/00; C02F 1/06; C02F 9/00; C02F 2201/005; C02F 2203/006; C02F 2209/003; C02F 2209/008; C02F 2209/00; C02F 2103/04; C02F 2001/427; C02F 2303/04; B01D 19/0031; B01D 19/00
USPC .......................................................... 210/97
See application file for complete search history.

(56) References Cited

U.S. PATENT DOCUMENTS

| | | | |
|---|---|---|---|
| 8,480,906 B2 | 7/2013 | Kobayashi | |
| 8,550,875 B2 | 10/2013 | Torii et al. | |
| 11,035,484 B2 | 6/2021 | Roitel et al. | |
| 2011/0210072 A1* | 9/2011 | Kobayashi | C02F 9/00 210/205 |
| 2012/0231703 A1* | 9/2012 | Torii | B24B 37/345 451/11 |

(Continued)

FOREIGN PATENT DOCUMENTS

| | | |
|---|---|---|
| CN | 101983175 A | 3/2011 |
| CN | 110325479 A | 10/2019 |

(Continued)

OTHER PUBLICATIONS

KR Office Action dated Oct. 18, 2022 issued in corresponding KR Application No. 10-2022-0023212.

(Continued)

*Primary Examiner* — Akash K Varma
(74) *Attorney, Agent, or Firm* — Fish & Richardson P.C.

(57) ABSTRACT

An ultrapure water manufacturing facility includes: a supply line connected to a pure water storage tank and in which a plurality of pure water treatment devices are sequentially arranged; a branch line branched downstream of the supply line and connected to the pure water storage tank; and a first automatic valve connected to the branch line and configured to be actuated by a double-acting actuator.

15 Claims, 3 Drawing Sheets

(56)               References Cited

U.S. PATENT DOCUMENTS

2020/0055743 A1 *  2/2020  Roitel  ........................ C02F 9/00

FOREIGN PATENT DOCUMENTS

| | | | |
|---|---|---|---|
| CN | 112770825 A | 5/2021 | |
| CN | 113874328 A | 12/2021 | |
| JP | 2003-251362 A | 9/2003 | |
| JP | 3996225 B2 | 10/2007 | |
| JP | 6091976 B2 | 3/2017 | |
| KR | 10-2005-0022430 A | 3/2005 | |
| KR | 100529634 B1 | 11/2005 | |
| KR | 10-2006-0010304 A | 2/2006 | |
| KR | 100626373 B1 | 9/2006 | |
| KR | 10-2007-0069340 A | 7/2007 | |
| KR | 101223101 B1 | 1/2013 | |
| KR | 101390441 B1 | 4/2014 | |
| TW | 201441162 A | 11/2014 | |
| WO | WO-2012099817 A2 * | 7/2012 | ................ C02F 9/00 |

OTHER PUBLICATIONS

Taiwanese Office Action dated Oct. 11, 2024 issued in corresponding Taiwanese Patent Appln. No. 112106289.
Office Action in Chinese Appln. No. 202310135642.1, mailed on Mar. 3, 2026, 15 pages (with English translation).

* cited by examiner

ULTRAPURE WATER PRODUCTION FACILITY

CROSS-REFERENCE TO RELATED APPLICATION

This application is based on and claims priority under 35 U.S.C. § 119 to Korean Patent Application No. 10-2022-0023212, filed on Feb. 22, 2022, in the Korean Intellectual Property Office, the disclosure of which is incorporated by reference herein in its entirety.

BACKGROUND

The inventive concepts relate to an ultrapure water production facility. More particularly, the inventive concepts relate to an ultrapure water production facility capable of reducing or preventing interruption of the supply of ultrapure water provided to semiconductor manufacturing facilities.

Ultrapure water theoretically refers to water having a resistivity of 18 M$\Omega$·cm or more. As the degree of integration of semiconductor devices increases, highly purified ultrapure water may be advantageous in semiconductor manufacturing processes. General ultrapure water manufacturing facilities mainly include pre-treatment facilities, primary treatment facilities, and secondary treatment facilities. Ultrapure water manufactured through ultrapure water manufacturing facilities is supplied to semiconductor manufacturing facilities. In this case, a continuous supply of ultrapure water is required to improve semiconductor production efficiency in semiconductor manufacturing processes.

SUMMARY

The inventive concepts provide an ultrapure water production facility in which supply of ultrapure water may be maintained even when power for operating an actuator configured to operate an automatic valve is not supplied due to a malfunction.

The inventive concepts also provide an ultrapure water production facility in which supply of ultrapure water may be maintained even when an actuator configured to operate an automatic valve may not be controlled due to a malfunction of a control device.

According to an aspect of the inventive concepts, there is provided an ultrapure water manufacturing facility including a supply line connected to a pure water storage tank and in which a plurality of pure water treatment devices are sequentially arranged; a branch line branched downstream of the supply line and connected to the pure water storage tank; and a first automatic valve connected to the branch line and configured to be actuated by a double-acting actuator. According to another aspect of the inventive concepts, there is provided an ultrapure water manufacturing facility including a supply line connected to a pure water storage tank and in which a plurality of pure water treatment devices are sequentially arranged; a branch line branched downstream of the supply line and connected to the pure water storage tank; a sub-branch line branched from the branch line and connected to a recovery facility; a first automatic valve connected to the branch line and located upstream of the pure water storage tank on the branch line; a second automatic valve connected to the sub-branch line and located upstream of the recovery facility on the sub-branch line; and a control device configured to control the first automatic valve and the second automatic valve, wherein the first automatic valve and the second automatic valve are on-off valves, and are configured to be actuated by double-acting actuators.

According to another aspect of the inventive concepts, there is provided an ultrapure water manufacturing facility including a pre-treatment facility including a first water storage tank configured to store water being treated and a plurality of first water treatment devices; a first make-up facility including a second water storage tank configured to store water being treated and a plurality of second water treatment devices; a second makeup device comprising a third water storage tank configured to store water being treated, a third water supply line configured to supply water being treated, the third water supply line being connected to the third water storage tank, and a plurality of third water treatment devices sequentially arranged in the third water supply line; and an ultrapure water production facility comprising a pure water storage tank, a supply line connected to the pure water storage tank, a plurality of pure water treatment devices sequentially arranged in the supply line, a branch line branched downstream of the supply line and connected to the pure water storage tank, a first automatic valve connected to the branch line, a sub-branch line branched from the branch line, and a second automatic valve connected to the sub-branch line, wherein the first automatic valve and the second automatic valve are configured to be actuated by double-acting actuators.

BRIEF DESCRIPTION OF THE DRAWINGS

Example embodiments of the inventive concepts will be more clearly understood from the following detailed description taken in conjunction with the accompanying drawings in which:

FIG. 1 is a block diagram schematically showing the flow of water being treated;

FIG. 2 is a block diagram illustrating an ultrapure water production facility according to example embodiments of the inventive concepts; and FIG. 3 is a block diagram illustrating an ultrapure water manufacturing facility according to example embodiments of the inventive concepts.

DETAILED DESCRIPTION OF EXAMPLE EMBODIMENTS

Hereinafter, example embodiments of the inventive concepts will be described more fully with reference to the accompanying drawings. In the accompanying drawings, like reference numerals may refer to like elements, and repeated descriptions of the like elements will be omitted.

Figure 1:
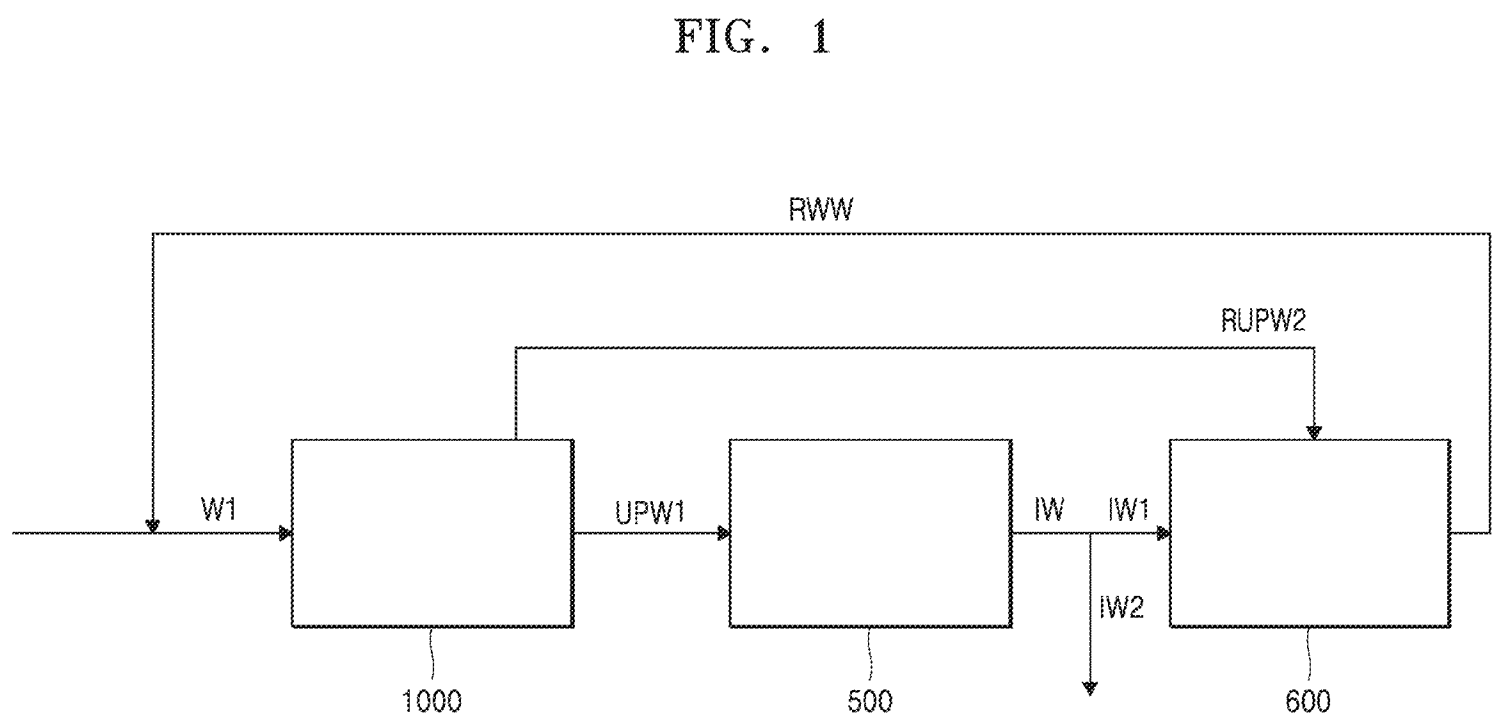

FIG. 1 is a block diagram schematically showing the flow of water being treated.

Referring to FIG. 1, first ultrapure water UPW1, which is a portion of ultrapure water manufactured by an ultrapure water manufacturing facility 1000 is provided to a semiconductor manufacturing facility 500. Second ultrapure water UPW2, which is a remaining portion of the ultrapure water manufactured by the ultrapure water manufacturing facility 1000, is branched into first circulating ultrapure water RUWP1 (see FIG. 2) flowing along a branch line 723 (see FIG. 2) as described below and second circulating ultrapure water RUWP2 flowing along a sub-branch line 725 (see FIG. 2). The first circulating ultrapure water RUWP1 is circulated to a pure water storage tank 410 (see FIG. 2) as described later, and the second circulating ultrapure water RUPW2 is supplied to a recovery facility 600. The first ultrapure water UPW1 supplied to the semiconductor manufacturing facility 500 includes several contaminants during a semiconductor manufacturing process and thus becomes industrial wastewater IW. A portion of the industrial wastewater IW, which is first industrial wastewater IW1, may be circulated to the ultrapure water manufacturing facility 1000 through a recovery facility 600, and a remaining portion of the industrial wastewater IW, which is a second industrial wastewater IW2, may be discharged to the outside through a separate purifier (not shown). The first industrial wastewater IW1 may be treated by the recovery facility 600 and then mixed with the second circulating ultrapure water RUWP2 to become recycling water RWW, and the recycling water RWW may be circulated to the ultrapure water manufacturing facility 1000. An ultrapure water production facility 400 according to example embodiments of the inventive concepts will now be described with reference to FIGS. 2 and 3.

Figure 2:
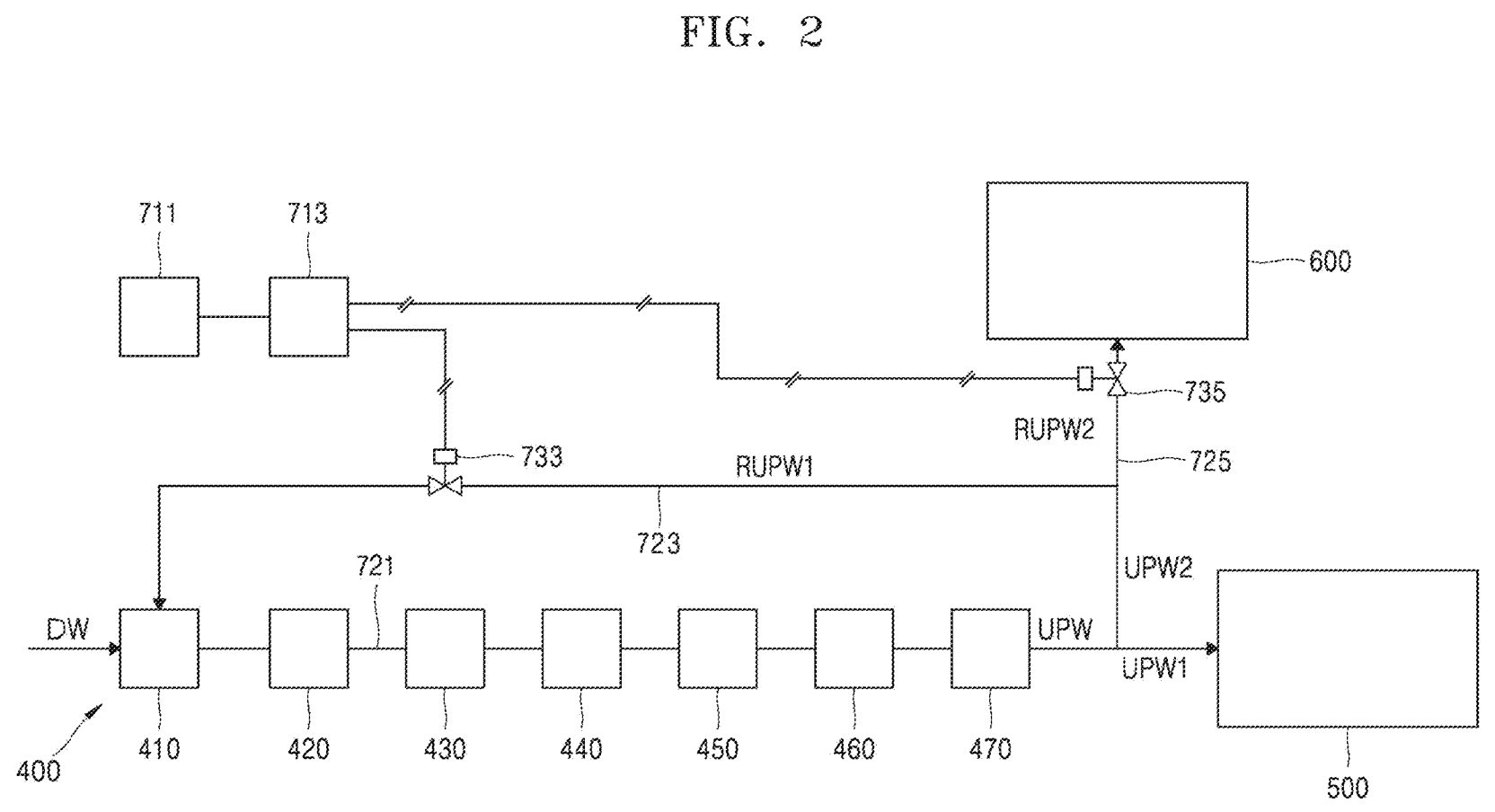

FIG. 2 is a block diagram schematically illustrating the ultrapure water production facility 400 according to example embodiments of the inventive concepts.

Referring to FIG. 2, the ultrapure water production facility 400 may include a pure water storage tank 410, a plurality of pure water treatment devices 420, 430, 440, 450, 460, and 470, a control device 711, a supply line 721, a branch line 723, and/or a first automatic valve 733.

The pure water storage tank 410 may store pure water DW for a certain time period. The pure water DW stored in the pure water storage tank 410 may be supplied to the plurality of pure water treatment devices 420, 430, 440, 450, 460, and 470 through the supply line 721.

The plurality of pure water treatment devices 420, 430, 440, and 450 may be located downstream of the pure water storage tank 410, and may be sequentially arranged on the supply line 721. The plurality of pure water treatment devices 420, 430, 440, 450, 460, and 470 may each be independently selected from any one of a heat exchanger, an ultraviolet sterilizer, a polisher, a degasifier, and a filtration membrane. For example, the plurality of pure water treatment devices 420, 430, 440, 450, 460, and 470 may be a heat exchanger, an ultraviolet sterilizer, a first polisher, a degasifier, a second polisher, and an ultrafiltration membrane sequentially arranged. In some example embodiments, the first polisher and the second polisher may be ion exchange resin towers filled with different ion exchange resins. For example, the first polisher may be an ion exchange resin tower filled with a catalyst resin for removing hydrogen peroxide, and the second polisher may be a mixed bed ion exchange resin tower for removing ions and the like. The plurality of pure water treatment devices 420, 430, 440, 450, 460, and 470 may be of an identical type. For example, the plurality of pure water treatment devices 420, 430, 440, 450, 460, and 470 may be an ultraviolet sterilizer, a first polisher, a degasifier, a second polisher, a first filtration membrane, and a second filtration membrane sequentially arranged. In some example embodiments, the first filtration membrane and the second filtration membrane may be of the identical type. The degasifier may be, for example, a membrane degasifier, but example embodiments are not limited thereto. The heat exchanger may be provided in plurality, but example embodiments are not limited thereto. The plurality of pure water treatment devices 420, 430, 440, 450, 460, and 470 may process the pure water DW supplied through the supply line 721 to manufacture ultrapure water UPW.

The control device 711 may control operations of the first automatic valve 733. For example, the control device 711 may be configured to transmit and receive electrical signals to and from a power supplier 713, and may control the power supplier 713 to supply or not supply power to the first automatic valve 733, thereby controlling whether the first automatic valve 733 is opened or closed.

The control device 711 may be implemented as hardware, firmware, software, or any combination thereof. For example, the control device 711 may be a computing device such as a workstation computer, a desktop computer, a laptop computer, or a tablet computer. For example, the control device 711 may include a memory device such as read only memory (ROM) and random access memory (RAM), and a processor configured to perform certain operations and algorithms, for example, a microprocessor, a central processing unit (CPU), and a graphics processing unit (GPU). The control device 711 may also include a receiver and a transmitter for receiving and transmitting signals. According to example embodiments, the control device 711 may be a programmable logic controller (PLC).

The supply line 721 may be connected to the pure water storage tank 410. The pure water DW supplied to the plurality of pure water treatment devices 420, 430, 440, 450, 460, and 470 through the supply line 721 may be processed by the plurality of pure water treatment devices 420, 430, 440, 450, 460, and 470 to become ultrapure water UPW from which an organic material, ions, etc. have been removed, and first ultrapure water UPW1, which is a portion of the ultrapure water UPW, may be provided to the semiconductor manufacturing facility 500 (see FIG. 1). According to example embodiments, a control valve (not shown) may be connected to the supply line 721, may be located between the pure water storage tank 410 and the plurality of pure water treatment devices 420, 430, 440, 450, 460, and 470. The control valve may control the flow rate, pressure, etc. of the pure water DW supplied along the supply line 721.

The branch line 723 may be branched downstream of the supply line 721 and may be connected to the pure water storage tank 410. Second ultrapure water UPW2, which is a remaining portion of the ultrapure water UPW processed by the plurality of pure water treatment devices 420, 430, 440, 450, 460, and 470, may be circulated along the branch line 723 and stored in the pure water storage tank 410. Accordingly, the pure water DW stored in the pure water storage tank 410 may maintain a constant water level.

The first automatic valve 733 may be connected to the branch line 723 and may be located upstream of the pure water storage tank 410 on the branch line 723. According to example embodiments, the first automatic valve 733 may be an on-off valve that is opened or closed by the control device 711. For example, the first automatic valve 733 may be opened or closed according to whether power is supplied from the power supplier 713 controlled by the control device 711. Depending on whether the first automatic valve 733 is opened or closed, the second ultrapure water UPW2 may or may not be circulated to the pure water storage tank 410. For example, when the first automatic valve 733 is opened, the second ultrapure water UPW2 may be circulated to the pure water storage tank 410 along a branch line.

According to example embodiments, the first automatic valve 733 may be configured to be operated by a double-acting actuator. The double-acting actuator refers to an actuator capable of opening and closing a valve configured to be operated by the double-acting actuator by operating due to power independently supplied to two power ports. For example, the double-acting actuator may include a first power port and a second power port, and may open a valve when the first power port is supplied with power and close the valve when the second power port is supplied with power. Because the double-acting actuator operates the valve due to the power supplied to the two power ports as described above, even when power supply is interrupted due to a malfunction of a power supplier while power is supplied to any one power port, a valve configured to be actuated by the double-acting actuator may maintain its last operating state.

In conventional ultrapure water production facilities, an automatic valve connected to a branch line is configured to be operated by a single-acting actuator. Accordingly, when the power supplied to one power port of the single-acting actuator is not supplied due to the malfunction, the automatic valve cannot maintain its last operating state and thus cannot maintain an open state and is closed. As the automatic valve is closed, a portion of the ultrapure water produced by an ultrapure water production facility is not circulated to a pure water storage tank, and accordingly, the flow rate and pressure of the pure water stored in the pure water storage tank cannot be maintained, so that the pure water is not supplied smoothly. As the pure water is not supplied smoothly, an ultrapure water production process using pure water is also not smoothly performed, so that the ultrapure water supply is stopped. This causes a problem in that the efficiency of a semiconductor manufacturing process using ultrapure water is deteriorated. However, the ultrapure water production facility 400 according to example embodiments of the inventive concepts is connected to the branch line 723 and includes the first automatic valve 733 configured to be operated by a double-acting actuator. Thus, even when power supply to the double-acting actuator is stopped due to a malfunction, the first automatic valve 733 may still maintain an open state, so that the supply of pure water may not be stopped. Accordingly, the production of ultrapure water by using the ultrapure water production facility 400 may be continued, and the produced ultrapure water may be continuously supplied to the semiconductor manufacturing facility 500 (see FIG. 1). Accordingly, the efficiency of the semiconductor manufacturing process may be improved.

According to example embodiments, the double-acting actuator may be of a rack and pinion type.

According to example embodiments, the first automatic valve 733 may be a pneumatic valve. In some example embodiments, the power supplied by the power supplier 713 may be air, and the air is supplied to any one of the two power ports included in the first automatic valve 731 so that the first automatic valve 733 may be opened or closed, and the air is supplied to the other one of the two power ports so that the first automatic valve 733 may be closed or opened.

According to example embodiments, the first automatic valve 733 may be a normal open type valve. In other words, the first automatic valve 733 may be configured to be closed when power is supplied by the power supplier 713 and opened when power is not supplied by the power supplier 713. Conventionally, because an automatic valve connected to a branch line is a normally closed valve, when a power supplier cannot be controlled due to a malfunction of a control device, the normally closed automatic valve is closed. Accordingly, a portion of the ultrapure water produced by an ultrapure water production facility is not circulated to a pure water storage tank, and accordingly, the water level of the pure water stored in the pure water storage tank cannot be maintained. In general, nitrogen gas is supplied into the pure water storage tank to reduce or prevent oxygen from dissolving in the pure water stored in the pure water storage tank. If a portion of the ultrapure water does not circulate due to a malfunction of the control device, the water level of the pure water stored in the pure water storage tank is lowered. Because the rate of supplying nitrogen into the pure water storage tank does not immediately reflect the rate at which the water level of the pure water decreases, oxygen is dissolved in the pure water stored in the pure water storage tank, which leads to deterioration of the quality of the pure water. However, because the ultrapure water production facility 400 according to example embodiments of the inventive concepts includes the first automatic valve 733 of a normally open type, even when a malfunction occurs in the control device 711, the first automatic valve 733 may maintain an open state. Accordingly, the second ultrapure water UPW2 may be continuously circulated to the pure water storage tank 410 through the branch line 723. Therefore, the water level of the pure water storage tank 410 may be maintained, and thus an increase in the amount of dissolved oxygen in the pure water DW stored in the pure water storage tank 410 may be reduced or prevented, thereby improving the quality of the pure water DW. The quality of the ultrapure water UPW produced by using the ultrapure water production facility 400 may also be improved.

According to example embodiments, the ultrapure water production facility 400 may further include a sub-branch line 725 branched from the branch line 723 and a second automatic valve 735 connected to the sub-branch line 725.

The sub-branch line 725 may be branched downstream of the first automatic valve 733 on the branch line 723. In some example embodiments, first circulating ultrapure water RUPW1, which is a portion of the second ultrapure water UPW2, may be circulated to the pure water storage tank 410 along the branch line 723, and second circulating ultrapure water RUPW2, which is a remaining portion of the second ultrapure water UPW2, may be supplied to a recovery facility 600 along the sub-branch line 725.

The second automatic valve 735 may be connected to the sub-branch line 725 and may be located upstream of the recovery facility 600 on the sub-branch line 725. The second circulating ultrapure water RUPW2 may or may not be supplied to the recovery facility 600 according to the opening or closing of the second automatic valve 735. The second automatic valve 735 may be controlled by the control device 711 and the power supplier 713. For example, the second automatic valve 735 may be opened or closed by being supplied or not being supplied with power by the power supplier 713 controlled by the control device 711.

According to example embodiments, the second automatic valve 735 may be a normal closed valve. In other words, the second automatic valve 735 may be configured to be opened when power is supplied by the power supplier 713 and closed when power is not supplied by the power supplier 713. When the second automatic valve 735 is a normally closed valve and a malfunction of the control device 711 occurs, the second automatic valve 735 is closed, so that the second circulation ultrapure water RUPW2 is no longer supplied to the recovery facility 600 through the sub-branch line 725. Therefore, the water level of the pure water stored in the pure water storage tank 410 may be maintained, and thus an increase in the amount of dissolved oxygen in the pure water DW stored in the pure water storage tank 410 may be reduced or prevented, thereby improving the quality of the pure water DW. The quality of the ultrapure water UPW produced by using the ultrapure water production facility 400 may also be improved.

According to example embodiments, the second automatic valve 735 may be configured to be operated by a double-acting actuator. Accordingly, the second automatic valve 735 may operate according to the same principle as the first automatic valve 733 described with reference to FIG. 2.

According to example embodiments, the second automatic valve 735 may be an on-off valve that supplies or does not supply the second circulating ultrapure water RUPW2 to the recovery facility 600 according to opening and closing.

According to example embodiments, the double-acting actuator operating the second automatic valve 735 may be a rack and pinion type valve.

According to an embodiments, the second automatic valve 735 may be a pneumatic valve.

Figure 3:
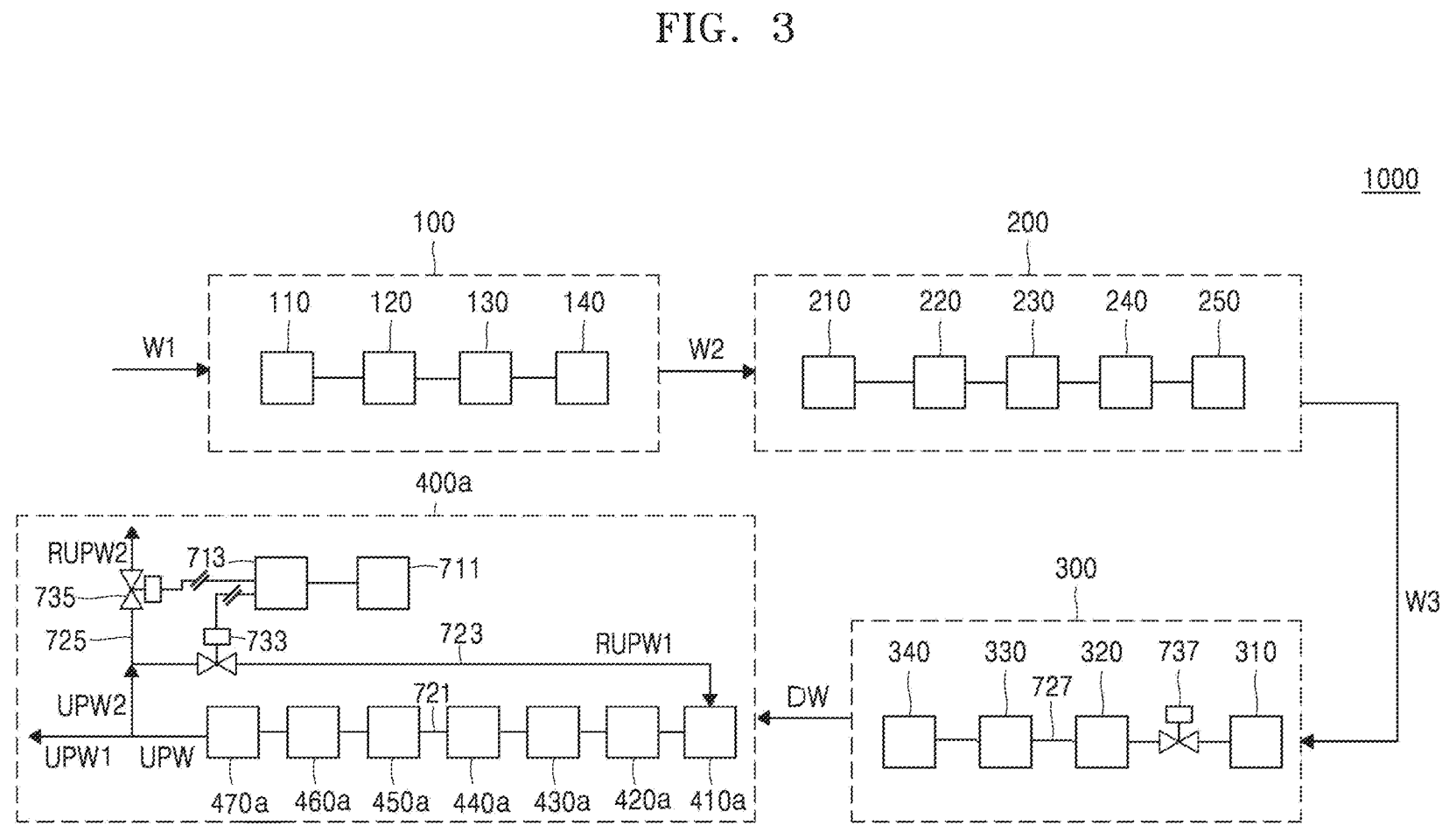

FIG. 3 is a block diagram illustrating an ultrapure water manufacturing facility 1000 according to example embodiments of the inventive concepts.

Referring to FIG. 3, the ultrapure water manufacturing facility 1000 may include a pre-treatment facility 100, a first make-up facility 200, a second make-up facility 300, and/or a polishing facility 400a. The polishing facility 400a includes a pure water storage tank 410a, a plurality of pure water treatment devices 420a, 430a, 440a, 450a, 460a, and 470a, supply line 721, a branch line 723, a sub-branch line 725, a first automatic valve 733, a second automatic valve 735, and/or a control device 711. The control device 711, the supply line 721, the branch line 723, the sub-branch line 725, the first automatic valve [731] 733, and the second automatic valve 735 are similar to the control device 711, the supply line 721, the branch line 723, the sub-branch line 725, the first automatic valve 733, and the second automatic valve 735 described with reference to FIG. 2, respectively, and thus differences therebetween will now be focused on and described.

The pre-treatment facility 100 may include a first water storage tank 110 for storing water being treated and a plurality of first water treatment devices 120, 130, and 140. The first water storage tank 110 may store first to-be-treated water W1 for a certain time period. The first to-be-treated water W1 may be supplied from the first water storage tank 110 to the plurality of first water treatment devices 120, 130, and 140. The plurality of first water treatment devices 120, 130, and 140 may be sequentially arranged downstream of the first water storage tank 110. The plurality of first water treatment devices 120, 130, and 140 may be, for example, a heat exchanger, a filtration membrane, and a reverse osmosis membrane, respectively. FIG. 3 illustrates example embodiments in which the pre-treatment facility 100 includes the three first water treatment devices 120, 130, and 140, but example embodiments of the inventive concepts are not limited thereto. The first to-be-treated water W1 is sequentially treated by the plurality of first water treatment devices 120, 130, and 140, and thus second to-be-treated water W2 from which some ions, organic materials, etc. included in the first to-be-treated water W1 may be produced. The second to-be-treated water W2 may undergo additional processing provided by the first make-up facility 200.

According to example embodiments, a control valve (not shown) may be located between the first water storage tank 110 and the plurality of first water treatment devices 120, 130, and 140. The control valve may control the flow rate, pressure, etc. of the first to-be-treated water W1 supplied.

The first make-up facility 200 may include a second water storage tank 210 for storing water being treated, and a plurality of second water treatment devices 220, 230, 240, and 250. The second water storage tank 210 may store the second to-be-treated water W2 for a certain time period. The second to-be-treated water W2 may be supplied from the second water storage tank 210 to the plurality of second water treatment devices 220, 230, 240, and 250. The plurality of second water treatment devices 220, 230, 240, and 250 may be sequentially arranged downstream of the second water storage tank 210. The plurality of second water treatment devices 220, 230, 240, and 250 may be, for example, an ultraviolet sterilizer, a filter, a reverse osmosis membrane, and an electrodeionization device, respectively. FIG. 3 illustrates example embodiments in which the first make-up facility 200 includes the four second water treatment devices 220, 230, 240, and 250, but example embodiments of the inventive concepts are not limited thereto. The second to-be-treated water W2 is sequentially treated by the plurality of second water treatment devices 220, 230, 240, and 250, and thus third to-be-treated water W3 from which some ions, organic materials, etc. included in the second to-be-treated water W2 may be produced. The third to-be-treated water W3 may undergo additional processing provided by the second make-up facility 300.

According to example embodiments, a control valve (not shown) may be located between the second water storage tank 210 and the plurality of second water treatment devices 220, 230, 240, and 250. The control valve may control the flow rate, pressure, etc. of the second to-be-treated water W2 supplied.

The second make-up facility 300 may include a third water storage tank 310 for storing water being treated, a third water supply line 727 for supplying water being treated, and a plurality of third water treatment devices 320, 330, and 340. The third water storage tank 310 may store the third to-be-treated water W3 for a certain time period. The third water supply line 727 may be connected to the third water storage tank 310, and may supply the third to-be-treated water W3 stored in the third water storage tank 310 to the plurality of third water treatment devices 320, 330, and 340. On the third water supply line 727, the plurality of first water treatment devices 320, 330, and 340 may be sequentially arranged downstream of the third water storage tank 310. Each of the plurality of third water treatment devices 320, 330, and 340 may independently be any one of an ultraviolet sterilizer, a filter, a reverse osmosis membrane, and an electrodeionization device, and the like. FIG. 3 illustrates example embodiments in which the second make-up facility 300 includes the three third water treatment devices 320, 330, and 340, but example embodiments of the inventive concepts are not limited thereto. The third to-be-treated water W3 is sequentially treated by the plurality of third water treatment devices 320, 330, and 340, and thus third to-be-treated water W3 from which some ions, organic materials, etc. included in the third to-be-treated water W3 may be produced. The pure water DW may undergo additional processing provided by the polishing facility 400a.

According to example embodiments, the ultrapure water manufacturing facility 1000 may further include a third automatic valve 737. The third automatic valve 737 may be connected to the third water supply line 727, and may be arranged between the third water storage tank 310 and the plurality of third water treatment devices 320, 330, and 340.

According to example embodiments, the third automatic valve 737 may be configured to be operated by a double-acting actuator. Accordingly, even when the power supply to the double-acting actuator is stopped due to a malfunction, the third automatic valve 737 may still maintain an open state, so that the supply of the third to-be-treated water W3 may not be stopped. Accordingly, the production of ultrapure water through the ultrapure water manufacturing facility 1000 by using the third automatic valve 737 may be continued, and the produced ultrapure water may be continuously supplied to the semiconductor manufacturing facility 500 (see FIG. 1). Accordingly, the efficiency of the semiconductor manufacturing process may be improved.

According to example embodiments, the third automatic valve 737 may be a pneumatic valve.

According to example embodiments, the third automatic valve 737 may be a rack and pinion type valve.

According to example embodiments, the third automatic valve 737 may be an on-off valve that supplies or does not supply the third to-be-treated water W3 according to opening and closing.

The pure water storage tank 410a and the plurality of pure water treatment devices 420a, 430a, 440a, 450a, 460a, and 470a of the polishing facility 400a may be similar to the pure water storage tanks 410 and the plurality of pure water treatment devices 420, 430, 440, 450, 460, and 470 of the ultrapure water production facility 400 of FIG. 2. As the pure water DW is treated by the polishing facility 400a, ultrapure water UPW from which ions, organic materials, microorganisms, particles, etc. included in the pure water DW have been removed may be produced. The ultrapure water UPW may be supplied to the semiconductor manufacturing facility 500 (see FIG. 1) to be used in a semiconductor manufacturing process.

The inventive concepts have been particularly shown and described with reference to example embodiments thereof. The terminology used herein is for the purpose of describing example embodiments only and is not intended to be limiting of the inventive concepts. Therefore, it will be understood by those skilled in the art that various changes in form and details may be made therein without departing from the spirit and scope of the inventive concepts as defined by the appended claims.

While the inventive concepts have been particularly shown and described with reference to example embodiments thereof, it will be understood that various changes in form and details may be made therein without departing from the spirit and scope of the following claims.

What is claimed is:

1. An ultrapure water manufacturing facility comprising:
   a supply line connected to a pure water storage tank, the pure water storage tank being connected to a first pure water treatment device of a plurality of sequentially arranged pure water treatment devices;
   a branch line branched downstream of the supply line, wherein the branch line is connected between a last pure water treatment device of the plurality of sequentially arranged pure water treatment devices and the pure water storage tank, and wherein the branch line is configured to supply ultrapure water produced by the last pure water treatment device to the pure water storage tank;
   a first automatic valve connected to the branch line upstream of the pure water storage tank; and
   a first double-acting actuator arranged to actuate the first automatic valve, wherein the first double-acting actuator comprises a plurality of power ports,
   wherein the first double-acting actuator is configured to maintain, upon an interruption of power supplied to a first power port of the plurality of power ports, an operating state of the first automatic valve at the interruption of power and maintain a continuous supply of the ultrapure water to the pure water storage tank upon the interruption of power.

2. The ultrapure water manufacturing facility of claim 1, wherein the first automatic valve is a pneumatic valve.

3. The ultrapure water manufacturing facility of claim 1, wherein the first automatic valve is an on-off valve.

4. The ultrapure water manufacturing facility of claim 1, wherein the first double-acting actuator is of a rack and pinion type.

5. The ultrapure water manufacturing facility of claim 1, wherein the first automatic valve is a normally opened valve.

6. The ultrapure water manufacturing facility of claim 1, further comprising:
   a sub-branch line branched from the branch line; and
   a second automatic valve connected to the sub-branch line.

7. The ultrapure water manufacturing facility of claim 6, wherein the second automatic valve is configured to be actuated by a second double-acting actuator.

8. The ultrapure water manufacturing facility of claim 6, wherein the second automatic valve is an on-off valve.

9. The ultrapure water manufacturing facility of claim 6, wherein the second automatic valve is a normally closed valve.

10. The ultrapure water manufacturing facility of claim 7, wherein the second double-acting actuator is of a rack and pinion type.

11. The ultrapure water manufacturing facility of claim 7,
   wherein the sub-branch line is connected to a recovery facility, and
   wherein the recovery facility is configured to receive a supply of the ultrapure water produced by the last pure water treatment device.

12. The ultrapure water manufacturing facility of claim 11,
   wherein the second double-acting actuator is configured to be operated by a controller,
   wherein, upon malfunction of the controller, the supply of the ultrapure water to the recovery facility is stopped.

13. The ultrapure water manufacturing facility of claim 1, wherein the plurality of sequentially arranged pure water treatment devices includes one or more of a heat exchanger, an ultraviolet sterilizer, a polisher, a degasifier, and a filtration membrane.

14. The ultrapure water manufacturing facility of claim 1, wherein the plurality of sequentially arranged pure water treatment devices are located downstream from the pure water storage tank.

15. The ultrapure water manufacturing facility of claim 1, comprising:
   a pre-treatment facility configured to store first to-be-treated water and generate a second to-be-treated water;
   a first makeup facility configured to store the second to-be-treated water and generate a third to-be-treated water; and
   a second makeup facility configured to store the third to-be-treated water, generate pure water, and provide the pure water to the pure water storage tank.

* * * * *